United States Patent
Hong et al.

(10) Patent No.: US 9,904,407 B2
(45) Date of Patent: Feb. 27, 2018

(54) TOUCH SENSOR, DISPLAY APPARATUS INCLUDING THE SAME, AND METHOD OF SENSING TOUCH PANEL

(71) Applicant: Dongbu HiTek Co., Ltd., Gyeonggi-do (KR)

(72) Inventors: Won Cheol Hong, Seoul (KR); Yong In Han, Seoul (KR); Joon Song, Seoul (KR)

(73) Assignee: DB HITEK CO., LTD., Seoul (KR)

(*) Notice: Subject to any disclaimer, the term of this patent is extended or adjusted under 35 U.S.C. 154(b) by 27 days.

(21) Appl. No.: 15/046,641

(22) Filed: Feb. 18, 2016

(65) Prior Publication Data

US 2017/0045986 A1 Feb. 16, 2017

(30) Foreign Application Priority Data

Aug. 11, 2015 (KR) .................. 10-2015-0113216

(51) Int. Cl.
| | |
|---|---|
| *G06F 3/041* | (2006.01) |
| *G09G 3/36* | (2006.01) |
| *G09G 3/20* | (2006.01) |
| *G06F 3/044* | (2006.01) |
| *G06F 3/14* | (2006.01) |
| *G06F 13/40* | (2006.01) |

(52) U.S. Cl.
CPC ............ *G06F 3/0416* (2013.01); *G06F 3/044* (2013.01); *G06F 3/0412* (2013.01); *G06F 3/14* (2013.01); *G06F 13/4022* (2013.01); *G09G 3/3648* (2013.01); *G09G 2310/0297* (2013.01)

(58) Field of Classification Search
CPC ........ G06F 3/044; G06F 3/041; G06F 3/0412; G06F 3/0416; G06F 2203/04104; G06F 2203/04106
See application file for complete search history.

(56) References Cited

U.S. PATENT DOCUMENTS

| | | | | |
|---|---|---|---|---|
| 8,421,772 B2* | 4/2013 | Li | .................. | G06F 3/0416 178/18.05 |
| 8,723,827 B2* | 5/2014 | Wright | ................ | G06F 3/044 345/156 |
| 8,970,549 B2* | 3/2015 | Lee | ................... | G06F 3/0416 345/173 |
| 9,024,913 B1* | 5/2015 | Jung | ................... | G06F 3/044 178/18.06 |
| 9,377,910 B2* | 6/2016 | Ahn | .................. | G06F 3/044 |
| 9,405,416 B2* | 8/2016 | Kang | ................. | G06F 3/044 |
| 9,588,617 B2* | 3/2017 | Chae | ................. | G06F 3/044 |

(Continued)

*Primary Examiner* — Dismery Mercedes
(74) *Attorney, Agent, or Firm* — Patterson Thuente Pedersen, P.A.

(57) ABSTRACT

A touch sensor is disclosed. The touch sensor includes a touch panel including sensing nodes arranged in a matrix form and sensing lines connected to the sensing nodes, a touch sensing unit for providing driving signals for driving the sensing nodes, and a selector including a plurality of multiplexers for selectively providing the driving signals provided from the touch sensing unit to the sensing lines of the touch panels, wherein each of the multiplexers is selectively connected to two or more corresponding sensing nodes among the sensing nodes, and the two or more sensing nodes of the touch panel, selectively connected to each of the multiplexers, are positioned at different columns and rows.

11 Claims, 13 Drawing Sheets

(56) References Cited

U.S. PATENT DOCUMENTS

| | | | |
|---|---|---|---|
| 9,619,086 B2 * | 4/2017 | Park | G06F 3/044 |
| 2014/0009438 A1 * | 1/2014 | Liu | G06F 1/16 |
| | | | 345/174 |
| 2015/0116236 A1 * | 4/2015 | Kim | G06F 3/016 |
| | | | 345/173 |
| 2015/0309661 A1 * | 10/2015 | Kim | G06F 3/0418 |
| | | | 345/174 |
| 2016/0098118 A1 * | 4/2016 | Lin | G06F 3/044 |
| | | | 345/174 |
| 2016/0320886 A1 * | 11/2016 | Kim | G06F 3/0412 |

* cited by examiner

| CD11 | CD12 | CD13 | CD14 | CD15 | CD16 | | CD1j |
|------|------|------|------|------|------|---|------|
| CD21 | CD22 | CD23 | CD23 | CD24 | CD25 | | CD2j |
| CD31 | CD32 | CD33 | CD34 | CD35 | CD36 | ... | CD3j |
| CD41 | CD42 | CD43 | CD43 | CD44 | CD45 | | CD4j |
| CD51 | CD52 | CD53 | CD54 | CD55 | CD56 | | CD5j |
| | | | ⋮ | | | | |
| CDi1 | CDi2 | CDi3 | CDi4 | CDi5 | CDi6 | | CDij |

FIG.4B

| RD11 | RD12 | RD13 | RD14 | RD15 | RD16 | ... | RD1j |
|------|------|------|------|------|------|-----|------|
| RD21 | RD22 | RD23 | RD24 | RD25 | RD26 |     | RD2j |
| RD31 | RD32 | RD33 | RD34 | RD35 | RD36 |     | RD3j |
| RD41 | RD42 | RD43 | RD44 | RD45 | RD46 |     | RD4j |
| RD51 | RD52 | RD53 | RD54 | RD55 | RD56 |     | RD5j |
|      |      |      | ⋮    |      |      |     |      |
| RDi1 | RDi2 | RDi3 | RDi4 | RDi5 | RDi6 |     | RDij |

FIG.5A

|            | FIRST COLUMN | SECOND COLUMN |
|------------|--------------|---------------|
| FIRST ROW  | 500          | 300           |
| SECOND ROW | 600          | 800           |

| INTERMEDIATE COORDINATES | 181.8 | 109.1 |
|--------------------------|-------|-------|
| LAST COORDINATES         | 145.5 |       |

FIG.5B

|            | FIRST COLUMN | SECOND COLUMN |
|------------|--------------|---------------|
| FIRST ROW  | 500          | 450           |
| SECOND ROW | 600          | 1200          |

| INTERMEDIATE COORDINATES | 181.8 | 109.1 |
|--------------------------|-------|-------|
| LAST COORDINATES         | 138.2 |       |

| Mux<br>ROW | 260-1 | | | 260-2 | | | 260-3 | | |
|---|---|---|---|---|---|---|---|---|---|
| | 1 | 2 | 3 | 4 | 5 | 6 | 7 | 8 | 9 |
| FIRST ROW | ON | OFF | OFF | OFF | OFF | ON | OFF | ON | OFF |
| SECOND ROW | OFF | ON | OFF | ON | OFF | OFF | OFF | OFF | ON |
| THIRD ROW | OFF | OFF | ON | OFF | ON | OFF | ON | OFF | OFF |

FIG.13
| Mux\COLUMN | 260-1 | | | 260-2 | | | 260-3 | | |
|---|---|---|---|---|---|---|---|---|---|
| | 1 | 2 | 3 | 4 | 5 | 6 | 7 | 8 | 9 |
| FIRST COLUMN | ON | OFF | OFF | ON | OFF | OFF | ON | OFF | OFF |
| SECOND COLUMN | OFF | ON | OFF | OFF | ON | OFF | OFF | ON | OFF |
| THIRD ROW | OFF | OFF | ON | OFF | OFF | ON | OFF | OFF | ON |
FIG.14
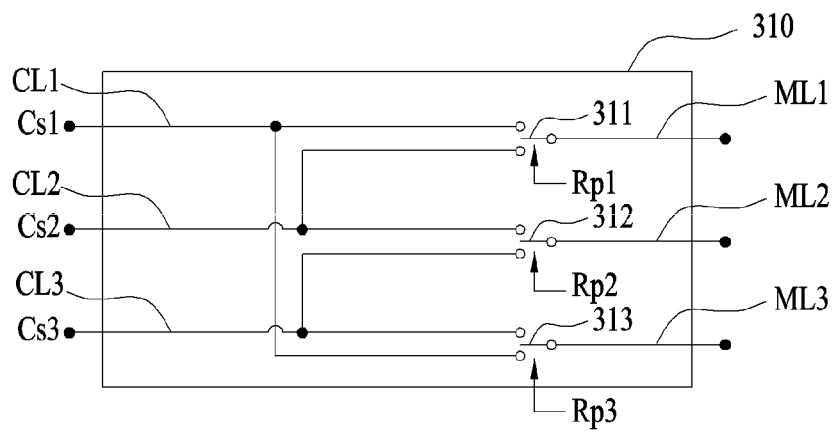
FIG.15
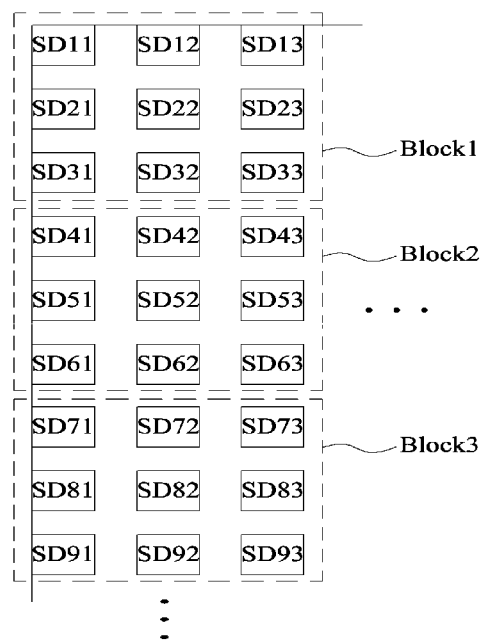

TOUCH SENSOR, DISPLAY APPARATUS INCLUDING THE SAME, AND METHOD OF SENSING TOUCH PANEL

This application claims the benefit of Korean Patent Application No. 10-2015-011321, filed on Aug. 11, 2015, which is hereby incorporated by reference as if fully set forth herein.

BACKGROUND OF THE INVENTION

Field of the Invention

The claimed invention relates to a touch sensor and a method of sensing a touch.

Discussion of the Related Art

A touch sensor is a device for allowing a human finger or other contact means to contact a character or a figure displayed on a screen of a display apparatus so as to input a user command and is attached onto an image display apparatus and used. The touch sensor may convert a contact point that a human finger or the like contacts into an electrical signal and use the converted electrical signal as an input signal.

A method for operating a touch sensor may include a resistive method, an optical sensing method, a capacitive method, and so on. A touch sensor using the capacitive method detects a change in capacitance formed between a human finger and at least one conductive detection pattern, a ground electrode, or the like during contact with the human finger or an object and converts a contact point into an electrical signal.

For convenience of use and sophisticated design aesthetics, a touchscreen-type display module including a touch sensor for input has also been used in an automated teller machine (ATM) device or common home appliances such as a television (TV), as well as a portable electronic device such as a cellular phone.

Recently, for thinner portable terminals, an in-cell-type display apparatus configured by installing elements constituting a touchscreen in a display device has been developed.

Undesirable electrical noise can be introduced during operation of a touch sensor, and a touch signal is shaken when noise is introduced. Accordingly, touch may not be recognized or an error may be generated in touch coordinates and touch coordinates may be calculated to obtain unintended touch input.

SUMMARY OF THE INVENTION

Accordingly, the claimed invention is directed to a touch sensor, a display apparatus including the same, and a method of sensing a touch panel that substantially obviates one or more problems due to limitations and disadvantages of the related art.

An object of the claimed invention is to provide a touch sensor and a method of sensing a touch panel, for preventing noise from affecting coordinates according to a touch sensing result even if the noise is introduced into a touch panel.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a touch sensor may include a touch panel including sensing nodes arranged in a matrix form and sensing lines connected to the sensing nodes, a touch sensing unit for providing driving signals for driving the sensing nodes, and a selector including a plurality of multiplexers for selectively providing the driving signals provided from the touch sensing unit to the sensing lines of the touch panels, wherein each of the multiplexers is selectively connected to two or more corresponding sensing nodes among the sensing nodes, and the two or more sensing nodes of the touch panel, selectively connected to each of the multiplexers, are positioned at different columns and rows.

The two or more sensing nodes connected to each of the multiplexers may be time-divisionally selected.

Sensing nodes that are simultaneously selected by each of the multiplexers may be positioned at the same column.

Sensing nodes that are simultaneously selected by each of the multiplexers may be positioned at the same row.

Each of the multiplexers may include a plurality of selection switches for time-divisionally providing the driving signals provided from the touch sensing unit to sensing nodes.

The touch sensor may further include a controller for generating switch control signals for controlling the selection switches included in each of the multiplexers.

The controller may provide a common switch control signal to a first multiplexer among the multiplexers, and the touch sensing unit may further include a switching selection circuit for converting the common switch control signal and providing a signal obtained from a result of the converting to selection switches of any corresponding one of other multiplexers except for the first multiplexer.

The switching selection circuit may include connection lines with the common switch control signals provided thereto, control lines connected to the selection switches included in the any corresponding one multiplexer, and a switch for selectively connecting the connection lines to the control lines based on the selection control signals provided from the controller.

The touch panel may include sensing nodes arranged in a M×N (M and N each being a natural number greater than 1) matrix form, each of the multiplexers may be an M:1 multiplexer and is selectively connected to corresponding M sensing nodes among the sensing nodes in a M×N matrix form, and the M sensing nodes respectively connected to the multiplexers may be positioned at different rows and columns.

The sensing nodes arranged in an M×N matrix form, simultaneously selected by each of the M:1 multiplexer, may be positioned at the same column or the same row.

The touch sensing unit may include a plurality of sensing terminals, and each of the sensing terminals may provide driving signals to any corresponding one of the multiplexers.

In another aspect of the claimed invention, a display apparatus may include a panel including display pixels having data lines, gate lines, and sensing nodes, a driver for driving the data lines, a gate driver for driving the gate lines, and a touch sensing block for providing driving signals to sensing nodes the display pixels in a touch sensing operation period, wherein the touch sensing block may include a touch sensing unit for providing driving signals for driving the sensing nodes, and a selector including a plurality of multiplexers for selectively providing the driving signals provided from the touch sensing unit to the sensing lines of the touch panel, each of the multiplexers may be selectively connected to two or more corresponding sensing nodes among the sensing nodes, and the two or more sensing nodes of the touch panel, selectively connected to each of the multiplexers, may be positioned at different columns and rows.

Each of the display pixels may include a pixel capacitor, a gate connected to any corresponding one of gate lines, a source connected to any corresponding one of data lines, a transistor connected to one end of the pixel capacitor, and a common electrode connected to the other end of the pixel capacitor, and the sensing nodes may be common electrodes of the display pixels.

A common voltage may be applied to common electrodes in a display operation period.

In another aspect of the claimed invention, a method of sensing a touch panel including sensing nodes arranged in a matrix form with columns and row may include calculating first capacitance values based on a result obtained by performing a sensing operation in a first sensing direction, calculating second capacitance values based on a result obtained by performing a sensing operation in a second sensing direction, calculating first intermediate coordinates of touch using the first capacitance values, calculating second intermediate coordinates of touch using the second capacitance values, calculating first last coordinates based on the first intermediate coordinates, and calculating second last coordinates based on the second intermediate coordinates.

The first intermediate coordinates may be calculated based on the first capacitance values of two or more sensing nodes included in each column, and the second intermediate coordinates may be calculated based on the second capacitance values of two or more sensing nodes included in each row.

The first intermediate coordinates and the second intermediate coordinates may be calculated using a centroid method.

The first last coordinates and the second last coordinates may be calculated using a centroid method.

It is to be understood that both the foregoing general description and the following detailed description of the claimed invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 2A-2C, 3A-3C, 4A, 4B, 5A, 5B, 6A, 6B, 7A, and 7B are diagrams illustrating a method of sensing nodes of the touch panel illustrated in FIG. 1, according to an embodiment of the claimed invention;

FIG. 13 is a table showing operations of multiplexers for driving in the second sensing direction;

FIG. 14 is a diagram illustrating a switching selection circuit illustrated in FIG. 11B, according to an embodiment of the claimed invention;

FIG. 15 is a diagram illustrating a touch panel illustrated in FIG. 1, according to another embodiment of the claimed invention;

DETAILED DESCRIPTION OF THE INVENTION

Figure 1:
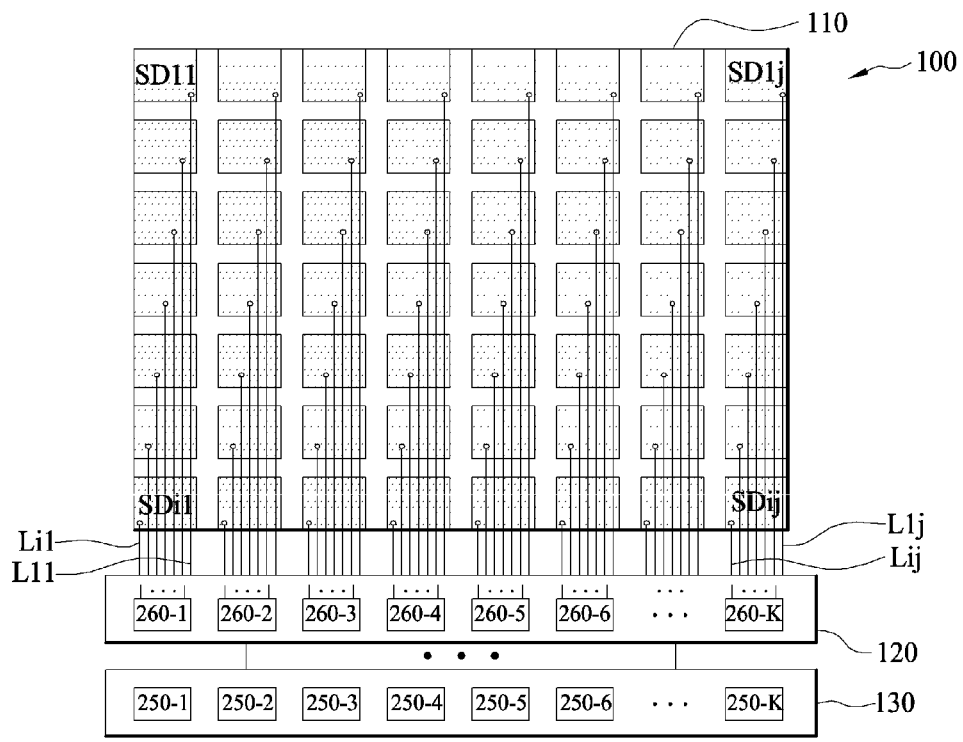
FIG. 1 is a structural diagram of a touch sensor according to an embodiment of the claimed invention.

Reference will now be made in detail to the preferred embodiments of the claimed invention, examples of which are illustrated in the accompanying drawings. In description of elements, it will be understood that when an element or layer is referred to as being "on" or "under" another element or layer, the element or layer can be directly on another element or layer or intervening elements or layers, and criteria for "on" and "under" will be provided based on the drawings.

Elements in the following drawings may be exaggerated, omitted, or schematically illustrated for conveniences and clarity of explanation, and the sizes of elements do not reflect their actual sizes completely. In addition, the same reference numerals in the drawings denote the same elements.

FIG. 1 is a structural diagram of a touch sensor 100 according to an embodiment of the claimed invention.

Referring to FIG. 1, the touch sensor 100 may include a touch panel 110, a selector 120, and a touch sensing unit 130.

The touch panel 110 may function substantially independently and include a plurality of sensing nodes SD11 to SDnm (n and m each being a natural number greater than 1) and sensing lines L11 to Lij (i and j each being a natural number greater than 1) which are present at different locations.

The sensing nodes SD11 to SDnm (n and m each being a natural number greater than 1) may be interchangeably used with terms such as a sensor pad, a sensor electrode, coordinates, sensing points, nodes, or a sensing node array.

The sensing nodes SD11 to SDnm (n and m each being a natural number greater than 1) may be arranged in a matrix form with rows and columns, without being limited thereto.

For example, the touch panel 110 may include an electrode pattern layer (not shown) including sensor pads that are spaced apart from each other, a substrate (not shown) disposed in front of the electrode pattern layer, and an insulating layer (not shown) disposed behind the electrode pattern layer. Here, the sensor pads may correspond to the sensing nodes SD11 to SDnm (n and m each being a natural number greater than 1).

The electrode pattern layer of the touch panel 110 may be formed of at least one among transmissive conductive materials, for example, indium tin oxide (ITO), tin oxide (TO), indium zinc oxide (IZO), indium tin zinc oxide (ITZO), indium aluminum zinc oxide (IAZO), indium gallium zinc oxide (IGZO), indium gallium tin oxide (IGTO), aluminum zinc oxide (AZO), antimony tin oxide (ATO), gallium zinc oxide (GZO), carbon nanotube (CNT), conductive polymers, and silver (Ag) or copper (Cu) transparent inks.

The electrode pattern layer of the touch panel 110 may be formed on one or more layers formed of glass or plastic via coating to form sensing node arrays S11 to Snm (n and m each being a natural number greater than 1).

The substrate of the touch panel 110 may be formed in the form of a dielectric film with high light transmittance and may include at least one of, for example, glass, polyethylene terephthalate (PET), polyethylene naphthalate (PEN), polyimide (PI), and acryl.

The insulating layer of the touch panel 110 may be a transmissive insulating layer such as a PET layer, or the like. According to another embodiment of the claimed invention, a shielding layer (not shown) may be disposed below the insulating layer in order to remove electromagnetic interference (EMI) and noise introduced into the electrode pattern layer.

The touch panel 110 may be merged with a layer for display according to an appropriate panel design method. The touch panel that is not merged with the display may include a 2D sensing node array using an appropriate method. Embodiments of the claimed invention may be applied to any touch sensing system including a 2D sensing node array.

Each of the sensing lines L11 to Lij (i and j each being a natural number greater than 1) may be connected to at least one of the sensing nodes SD11 to SDnm (n and m each being a natural number greater than 1). For example, one sensing line may be electrically connected to any corresponding one of the sensing nodes S11 to Snm (n and m each being a natural number greater than 1).

The sensing lines L11 to Lij (i and j each being a natural number greater than 1) may function as both of a driving line for driving the sensing nodes S11 to Snm (n and m each being a natural number greater than 1) and a sensing line for detecting whether a touch is performed, without being limited thereto, and thus according to another embodiment of the claimed invention, a driving line and a sensing line may be separated.

The touch sensing unit 130 may be electrically connected to the sensing lines L11 to Lij (n and m each being a natural number greater than 1) and may generate a driving signal to be provided to the sensing nodes S11 to Snm (n and m each being a natural number greater than 1). For example, the driving signal may be a pulse or alternating current (AC) type of current or voltage signal and may be a cyclic signal.

The selector 120 may be connected between the touch sensing unit 130 and the sensing lines S11 to Sn (n and m each being a natural number greater than 1) of the touch panel 110 and may selectively provide the driving signal provided from the touch sensing unit 130 to the sensing lines L11 to Lij (n and m each being a natural number greater than 1) of the touch panel 110.

For example, the selector 120 may provide the driving signal provided from the touch sensing unit 130 to at least one sensing line selected from the sensing lines L11 to Lij (n and m each being a natural number greater than 1) of the touch panel 110 in response to selection control signals Cs1 to Csr (r being a natural number greater than 1).

A method of driving a sensing node by the selector 120 will be described later.

According to selection of the sensing lines L11 to Lij (i and j each being a natural number greater than 1) of the touch panel 110 by the selector 120, the sensing nodes S11 to Snm (n and m each being a natural number greater than 1) of the touch panel 110 may be selectively driven.

For example, the driving signal may be sequentially or simultaneously provided to two or more sensing nodes of the touch panel 110. For example, the driving signal may be simultaneously provided to sensing nodes belonging to each column of the touch panel 110.

Here, the term "simultaneously" may refer to precisely simultaneous cases as well as almost simultaneous cases. For example, the simultaneous cases may refer to cases that begin and end almost simultaneously and/or cases in which time periods at least partially overlap each other.

The selector 120 may include a plurality of multiplexers 260-1 to 260-K (K being a natural number greater than 1). Each of the multiplexers 260-1 to 260-K may time-divisionally select sensing nodes. Selection of sensing nodes of the multiplexers 260-1 to 260-K will be described later.

The touch sensing unit 130 may provide the driving signal to the selector 120 and measure capacitance of sensing nodes to which the driving signal is provided by the selector 120.

The touch sensing unit 130 may include a plurality of sensing terminals 250-1 to 250-K (K being a natural number greater than 1).

Each of the sensing terminals 250-1 to 250-K (K being a natural number greater than 1) may provide a driving signal to any corresponding one of a plurality of multiplexers and measure capacitance of a sensing node to which the driving signal is provided by the corresponding multiplexer.

For example, each of the sensing terminals 250-1 to 250-K (K being a natural number greater than 1) may sample a voltage charged in a corresponding sensing node according to the driving signal and calculate capacitance using the sampled voltage.

For example, each of the sensing terminals 250-1 to 250-K (K being a natural number greater than 1) may include a sample and hold block for sampling the voltage charged in the corresponding sensing node.

Each of the sensing terminals 250-1 to 250-K (K being a natural number greater than 1) may further include an amplifier for amplifying the voltage sampled by the sample and hold block.

Each of the sensing terminals 250-1 to 250-K (K being a natural number greater than 1) may further include an analog-digital converter for analog-digital conversion of output of the amplifier.

Each of the sensing terminals 250-1 to 250-K (K being a natural number greater than 1) may further include a digital signal processor for calculating capacitance of sensing nodes based on a digital signal as output of the analog-digital converter.

Sensing nodes SD11 to SDij (i and j each being a natural number greater than 1) of the touch panel 110 may be grouped into a plurality of blocks. In this case, sensing nodes belonging to a plurality of blocks may not overlap each other.

Figure 10:
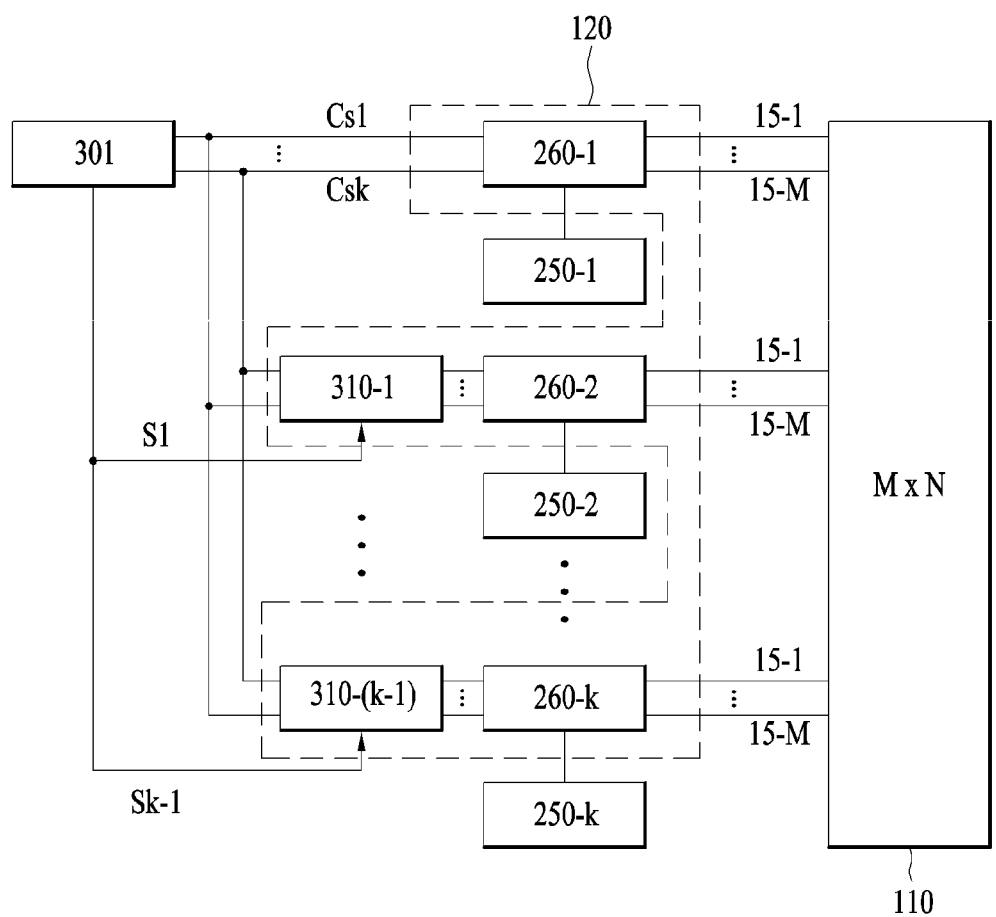
FIG. 10 is a diagram illustrating a selector illustrated in FIG. 1 according to an embodiment of the claimed invention.

FIG. 10 is a diagram illustrating the selector 120 illustrated in FIG. 1 according to an embodiment. The same reference numerals as in FIG. 1 denote the same elements, and the same elements will thus be schematically described or not be described.

Referring to FIG. 10, the selector 120 may include a plurality of (e.g., K (K being a natural number greater than)) M:1 multiplexers 260-1 to 260-K (K being a natural number greater than 1), and a plurality of (e.g., K−1) switching selection circuits 310-1 to 310-(K−1). The touch sensing unit 130 may include the sensing terminals 250-1 to 250-K (K being a natural number greater than 1) that respectively correspond to the multiplexers 260-1 to 260-K (K being a natural number greater than 1), each of the sensing terminals 250-1 to 250-K (K being a natural number greater than 1) may provide driving signals to corresponding multiplexers 260-1 to 260-3, and the driving signals may be provided to a sensing node of the touch panel 110, which is selected by the multiplexers 260-1 to 260-3. In addition, each of the sensing terminals 250-1 to 250-K (K being a natural number greater than 1) may measure change in capacitance of a sensing node to which a driving signal is selectively provided.

Each of the M:1 multiplexers 260-1 to 260-K (K being a natural number greater than 1) may be respectively connected to M corresponding sensing nodes among sensing nodes of the touch panel 110.

The touch panel 110 may include sensing nodes arranged in an M×N (M and N each being a natural number greater than 1) matrix.

For example, when the touch panel 110 includes 10×64 sensing nodes (640 of total sensing nodes), the selector 120 may include 64 10:1 multiplexers (e.g., 260-1 to 260-K, K=64), and each of the 64 10:1 multiplexers (e.g., 260-1 to 260-K, K=64) may be connected to 10 corresponding sensing nodes of the 640 sensing nodes of the touch panel 110 through selection lines 15-1 to 15-M (M being a natural number greater than 1). The selection lines 15-1 to 15-M (M being a natural number greater than 1) may connect sensing nodes corresponding to the respective multiplexers to each other.

The touch sensor 100 illustrated in FIG. 1 may further include a controller 301 for generating switch control signals Cs1 to CsK (K being a natural number greater than 1) for controlling the multiplexers 260-1 to 260-K (K being a natural number greater than 1).

Each of the M:1 multiplexers 260-1 to 260-K (K being a natural number greater than 1) may select any one of M sensing nodes connected to the touch panel 110 based on the switch control signals Cs1 to CsK (K being a natural number greater than 1) provided by the controller 301.

Each of the multiplexers 260-1 to 260-K (K being a natural number greater than 1) may provide the driving signals provided from the touch sensing unit 130 to time-divisionally corresponding sensing nodes in response to the switch control signals Cs1 to CsK (K being a natural number greater than 1).

For example, each of the multiplexers 260-1 to 260-K (K being a natural number greater than 1) may include a plurality of selection switches 1 to M. For example, an M:1 multiplexer may include M switches.

M sensing nodes corresponding to the touch panel 110 connected to each of the multiplexers 260-1 to 260-K (K being a natural number greater than 1) may be positioned at different rows and columns.

M sensing nodes positioned at different rows and columns of the touch panel 110 connected to each of the multiplexers 260-1 to 260-K (K being a natural number greater than 1) may be time-divisionally selected based on the switch control signals Cs1 to CsK (K being a natural number greater than 1).

For example, the M sensing nodes connected to each of the 64 multiplexers 260-1 to 260-K, K=64) may be positioned at different rows and columns.

For example, the switch control signals Cs1 to CsK (K being a natural number greater than 1) may be provided to a first multiplexer 260-1 of the multiplexers 260-1 to 260-K (K being a natural number greater than 1), and the first multiplexer 260-1 may time-divisionally select any one of M sensing nodes positioned at different rows and columns of the touch panel 110 connected to the first multiplexer 260-1 based on the switch control signals Cs1 to CsK (K being a natural number greater than 1).

In addition, each of the plurality of (e.g., K−1) switching selection circuits 310-1 to 310-(K−1) may be connected to any corresponding one of the other multiplexers 260-2 to 260-K except for a first multiplexer (e.g., 260-1).

The switching selection circuits 310-1 to 310-(K−1) may receive switching selection signals Cs1 to CsK (K being a natural number greater than 1) provided from the controller 301. The switching selection circuits 310-1 to 310-(K−1) may convert the switching selection signals Cs1 to CsK (K being a natural number greater than 1) based on selection control signals S1 to Sk−1 and provide the signals according to the conversion result to the corresponding multiplexers 260-2 to 260-K.

For example, the switching selection signals Cs1 to CsK (K being a natural number greater than 1) may be provided to M switches included in each multiplexer, and the switching selection circuits 310-1 to 310-(K−1) may change an order of the switching selection signals Cs1 to CsK (K being a natural number greater than 1) provide to the M switches included in each multiplexer.

As such, the multiplexers 260-1 to 260-K may be controlled according to the switching selection signals Cs1 to CsK (K being a natural number greater than 1) and signals obtained via conversion by the switching selection circuits 310-1 to 310-(K−1), M sensing nodes positioned at different rows and columns of the touch panel 110 connected to the multiplexers 260-1 to 260-K (K being a natural number greater than 1) may be time-divisionally selected, according to an embodiment. In addition, according to an embodiment, rows or columns of sensing nodes that are substantially simultaneously selected by the multiplexers 260-1 to 260-K (K being a natural number greater than 1) may be equalized so as to achieve first direction sensing or second direction sensing with respect to the touch panel 110.

Figure 11A:
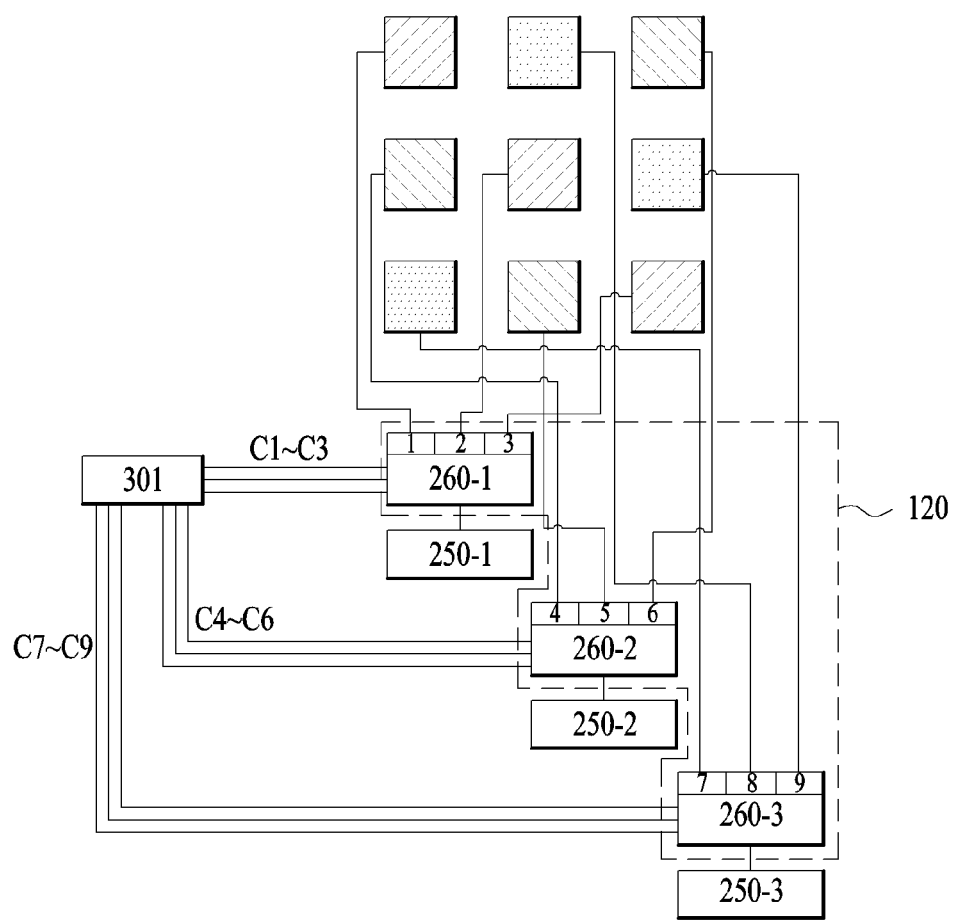
FIG. 11A is a diagram illustrating the selector illustrated in FIG. 10, according to an embodiment of the claimed invention.

FIG. 11A is a diagram illustrating the selector 120 illustrated in FIG. 10, according to an embodiment.

In FIG. 11A, the touch panel 110 may include sensing nodes arranged in a 3×3 matrix.

Referring to FIG. 1 and FIG. 11A, the selector 120 may include three 3:1 multiplexers 260-1 to 260-3, and the touch sensing unit 130 may include sensing terminals 250-1, 250-2, and 250-3 that respectively correspond to the three multiplexers 260-1 to 260-3 and provide driving signals to the corresponding multiplexers 260-1 to 260-3.

The controller 301 may generate switch control signals C1 to C9 to be provided to first to third multiplexers 260-1 to 260-3.

For example, the controller 301 may provide first to third switch control signals C1 to C3 to the first multiplexer 260-1, provide fourth to sixth switch control signals C4 to C6 to the second multiplexer 260-2, and provide seventh to ninth switch control signals C7 to C9 to the third multiplexer 260-3.

The first to third multiplexers 260-1 to 260-3 may be connected to three sensing nodes among nine sensing nodes, respectively, and three sensing nodes respectively connected to the first to third multiplexers 260-1 to 260-3 may be positioned at different rows and columns. For example, the first multiplexer 260-1 may be connected to a first sensing node (first row and first column), a second sensing node (second row and second column), and a third sensing node (third row and third column).

Each of the multiplexers 260-1 to 260-3 may select any one from corresponding sensing nodes based on the switch control signals C1 to C9 and connect the selected sensing node to a corresponding sensing terminal, in embodiments.

Each of the multiplexers 260-1 to 260-3 may time-divisionally select corresponding sensing nodes based on the switch control signals C1 to C9, in embodiments.

Each of the multiplexers 260-1 to 260-3 may include the three switches 1 to 9 connected to corresponding sensing nodes, in embodiments.

For example, each of the three multiplexers 260-1 to 260-3 may time-divisionally select three sensing nodes among nine sensing nodes of the touch panel 110. In this case, sensing nodes selected by each multiplexer may not overlap each other.

The controller 301 illustrated in FIG. 11A may generate nine independent switch control signals C1 to C9 in order to individually control the three multiplexers 260-1 to 260-3 and require nine independent connection lines in order to provide nine switch control signals to three multiplexers.

Three sensing nodes that are respectively time-divisionally connected to the multiplexers 260-1 to 260-3 may be positioned at different rows and columns.

For example, the first multiplexer 260-1 may time-divisionally select and may be connected to a first sensing node positioned at a first row and a first column, a second sensing node positioned at a second row and a second column, and a third sensing node positioned at a third row and a third column, based on the first to third switch control signals C1 to C3, and the time-divisionally selected first to third sensing nodes may be positioned at different rows and columns.

The second multiplexer 260-2 may time-divisionally select and may be connected to a fourth sensing node positioned at a first row and a third column, a fifth sensing node positioned at a second row and a first column, and a sixth sensing node positioned at a third row and a second column, based on the fourth to sixth switch control signals C4 to C6, and the time-divisionally selected fourth to sixth sensing nodes may be positioned at different rows and columns.

The third multiplexer 260-3 may time-divisionally select and may be connected to a seventh sensing node positioned in a first row and a second column, an eighth sensing node positioned at a second row and a third column, and a ninth sensing node positioned at a third row and a first column, based on the seventh to ninth switch control signals C7 to C9, and the time-divisionally selected seventh to ninth sensing nodes may be positioned at different rows and columns.

When a number M of multiplexing operations of a multiplexer is 3, the multiplexer may include three switches. For example, in FIG. 11A, each of the multiplexers 260-1 to 260-3 may include three switches (1 to 3, 4 to 6, or 7 to 9).

In addition, three switches of each multiplexer may be selected and turned on or off based on the switch control signals C1 to C9.

An operation of a multiplexer illustrated in FIG. 11A for performing a sensing operation in a first sensing direction or a second sensing direction will be described.

Figures 11B, 12:
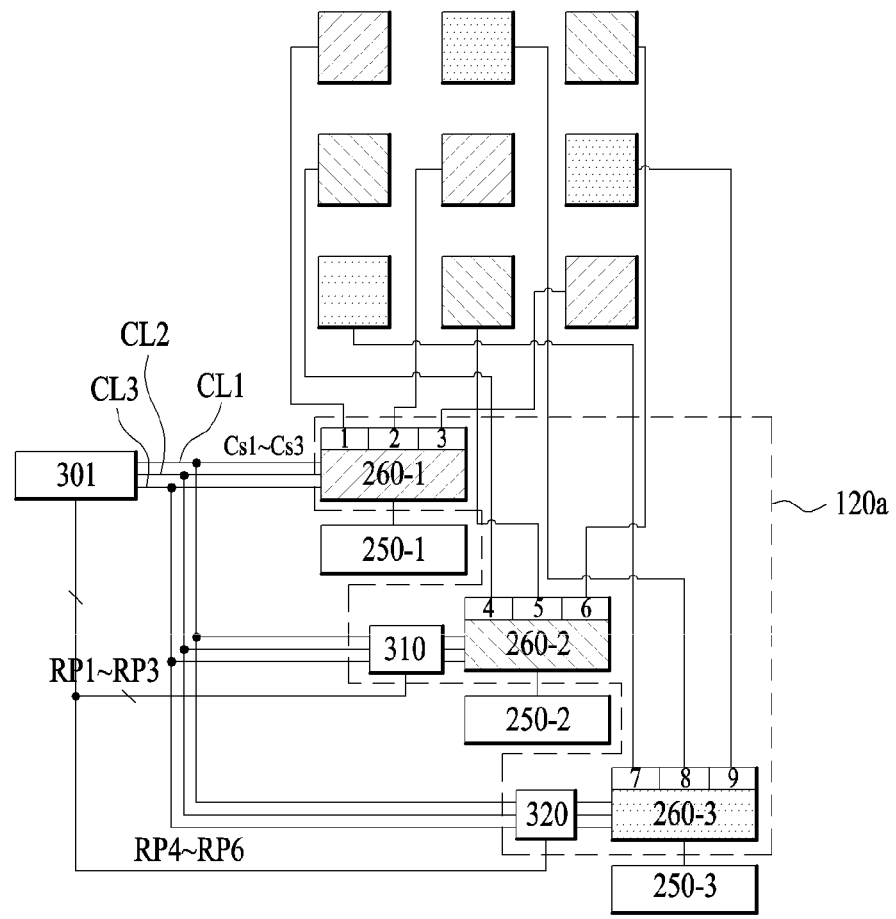
FIG. 11B illustrates a selector that is another example of the selector illustrated in FIG. 10, according to another embodiment of the claimed invention.
FIG. 12 is a table showing operations of multiplexers for driving in a first sensing direction.

FIG. 12 is a table showing operations of the multiplexers 260-1 to 260-3 for driving in the first sensing direction.

Referring to FIG. 12, ON may indicate that selection switches 1 to 9 included in the multiplexers 260-1 to 260-3 are turned on and refer to a first level (e.g., high voltage level) of the switch control signals C1 to C9 for turning on the selection switches 1 to 9.

OFF may indicate that selection switches 1 to 9 included in the multiplexers 260-1 to 260-3 are turned off and refer to a second level (e.g., low voltage level) of the switch control signals C1 to C9 for turning off the selection switches 1 to 9.

As shown in the table illustrated in FIG. 12, the selection switches 1 to 9 included in the first to third multiplexers 260-1 to 260-3 may be selectively turned on or off so as to simultaneously perform sensing operations on sensing nodes belonging to a first row, a second row, or a third row of any one block of the touch panel 110.

For example, the first multiplexer 260-1 may turn on only a first selection switch 1, the second multiplexer 260-2 may turn on only a sixth selection switch 6, and the third multiplexer 260-3 may turn on only an eighth selection switch 8 based on switch control signals SC1 to SC3 so as to simultaneously select sensing nodes belonging to a first row.

Accordingly, according to the table illustrated in FIG. 12, the selection switches 1 to 9 of the multiplexers 260-1 to 260-3 may be controlled so as to drive the touch panel 110 in the first sensing direction.

FIG. 13 is a table showing operations of the multiplexers 260-1 to 260-3 for driving in the second sensing direction.

As shown in the table illustrated in FIG. 13, the selection switches 1 to 9 included in the first to third multiplexers 260-1 to 260-3 may be selectively turned on or off so as to simultaneously perform sensing operations on sensing nodes belonging to a first column, a second column, or a third column.

For example, the first multiplexer 260-1 may turn on only the first selection switch 1, the second multiplexer 260-2 may turn on only the fourth selection switch 4, and the third multiplexer 260-3 may turn on only the seventh selection switch 7 based on the switch control signals SC1 to SC3 so as to simultaneously select sensing node belonging to a first column.

The selection switches 1 to 9 of the multiplexers 260-1 to 260-3 may be controlled according to the table illustrated in FIG. 13 so as to drive the touch panel 110 in the second sensing direction.

FIG. 11B illustrates a selector 120a that is another example of the selector 120 illustrated in FIG. 10, according to another embodiment. The same reference numerals as in FIG. 11A denote the same elements, and the same elements will thus be schematically described or not be described.

Referring to FIG. 11B, the selector 120a may include K (e.g., K=3) multiplexers (e.g., 260-1 to 260-3) and (K−1) switching selection circuits 310 and 320.

The controller 301 may provide common switch control signals Cs1 to Cs3 that are commonly used by the three multiplexers 260-1 to 260-3 to any one (e.g., 260-1) of a plurality of multiplexers (e.g., 260-1 to 260-3). The common switch control signals Cs1 to Cs3 may be provided to three connection lines CL1 to CL3.

Each of the switching selection circuits 310 and 320 may receive the common switch control signals Cs1 to Cs3, convert the received common switch control signals, and provide a signal according to the conversion result to any corresponding one of the other multiplexers 260-2 and 260-3.

Each of the switching selection circuits (e.g., 310 and 320 in the embodiment shown in FIG. 11B) may convert the common switch control signals based on selection control signals (e.g., RP1 to RP3 and RP4 to RP6) provided from the controller 301 and provide a signal according to the conversion result to a corresponding multiplexer.

For example, each of the switching selection circuits 310 and 320 may change an order of the common switch control signals Cs1 to Cs3 provided to correspond to the selection switches (4 to 6, and 7 to 9) of the multiplexers 260-2 and 260-3 based on the selection control signals RP1 to RP6.

That is, common switch control signals, an order of which is changed by the switching selection circuits 310 and 320, may be provided to any corresponding one of the multiplexers 260-2 and 260-3.

Although FIG. 11B illustrates an embodiment of the switching selection circuits 310 and 320 connected to the two multiplexers 260-2 and 260-3 of the three multiplexers 260-1 to 260-3, without being limited thereto, and thus according to another embodiment of the claimed invention, switching selection circuits may be configured to respectively correspond to all three multiplexers shown in this embodiment, or to any number of multiplexers employed in alternative embodiments.

The switching selection circuit 310 may be selectively provided to switches of multiplexers corresponding to common switch control signals in order to embody driving in a first or second sensing direction.

FIG. 14 is a diagram illustrating the switching selection circuit 310 illustrated in FIG. 11B, according to an embodiment.

Referring to FIG. 14, the switching selection circuit 310 may include a switch that is selectively connected to any one of two connection lines CL1 and CL2, CL2 and CL3, and CL3 and CL1 among the connection lines CL1 to CL3 to which the common switch control signals Cs1 to Cs3 are provided.

For example, the switching selection circuit 310 may include switches 311 to 313 for selectively connecting the connection lines CL1 to CL3 to which the common switch control signals Cs1 to Cs3 are provided, control lines ML1 to ML3 for controlling the switches 4, 5, and 6 of the corresponding multiplexers 260-2 (not shown in this Figure), and the connection lines CL1 to CL3 according to selection control signals (e.g., R1 to R3), to the control lines ML1 to ML3.

In order to embody driving in the first or second sensing direction, in FIG. 11B, the controller 301 may provide the common switch control signals Cs1 to Cs3 so as to control any one (e.g., 260-1) of the three multiplexers 260-1 to 260-3 as illustrated in FIGS. 12 and 13.

In order to embody driving in the first or second sensing direction, each of the switching selection circuits 310 and 320 may selectively provide the common switch control signals Cs1 to Cs3 to the selection switches 4 to 9 of the multiplexers 260-2 and 260-3 so as to control the multiplexers 260-2 and 260-3 as illustrated in FIGS. 12 and 13.

For example, with regard to sensing in the first sensing direction with respect to a first row illustrated in FIG. 12, Cs1 provided to the selection switches 1 to 3 of the first multiplexer 260-1 may be ON (high level), Cs2 may be OFF (low level), and Cs3 may be OFF (low level).

Referring to FIG. 12, for sensing in the first sensing direction, control signals to be provided to the selection switches 4 to 6 of the second multiplexer 260-2 need to be OFF, OFF, and ON, respectively.

Accordingly, a first switching conversion circuit 310 may change an order or positions of Cs1 in an ON state and Cs3 in an OFF state and provide the signals to the selection switches 4 to 6 of the second multiplexer 260-2.

That is, the first switching conversion circuit 310 may selectively connect the third control line ML3 to the first connection line CL1, selectively connect the first control line ML1 to the second connection line CL2, and selectively connect the second control line ML2 to the second connection line CL2, based on the selection control signals RP1 to RP3. According to selective connection between the control lines ML1 to ML3 of the first switching conversion circuit 310 and the connection lines CL1 to CL3, the selection switches 4 to 6 of the second multiplexer 260-2 may correspond to OFF, OFF, and ON, respectively, as illustrated in FIG. 12.

The first switching conversion circuit 310 according to an embodiment of the claimed invention may selectively control selection switches of multiplexers using a phenomenon whereby an order of selection switches included in each of the multiplexers 260-1 to 260-3 is shifted. Sensing nodes connected to multiplexers corresponding to an operation of the first switching conversion circuit 310 may be selected to perform sensing in the first or second sensing direction.

The description of FIG. 14 may also be applied to the switching selection circuit 320 illustrated in FIG. 11B in the same way.

Although the controller 301 of FIG. 11A provides nine independent switch control signals C1 to C9 in order to control the multiplexers 260-1 to 260-3, the controller 301 of FIG. 11B provides six selection control signals RP1 to RP6 for controlling the three switch control signals Cs1 to Cs3 and the two switching selection circuits 310 and 320.

FIG. 15 is a diagram illustrating the touch panel 110 illustrated in FIG. 1, according to another embodiment.

Referring to FIG. 15, the touch panel 110 may be divided into a plurality of blocks (e.g., Block1, Block2, Block3 . . . ), and sensing nodes SDnm included in each of the blocks (e.g., Block1, Block2, Block3 . . . ) may be arranged in the form of a matrix.

The sensing nodes included in each block may be arranged in a P×Q matrix (e.g., P=Q=3).

For example, sensing nodes SD11 to SD33 belonging to a first block Block1 may be arranged in a 3×3 matrix.

The multiplexers 260-1 to 260-$k$ may selectively provide driving signals provided from the touch sensing unit 130 to sensing nodes.

The multiplexers 260-1 to 260-$k$ may include a plurality of groups.

Each of the groups may correspond to any one of a plurality of blocks of the touch panel 110. Each of the groups may include two or more multiplexers.

For example, the number of multiplexers belonging to any one group corresponding to one block may be a value obtained by dividing the number of sensing nodes included in one block by a multiplexing number of times of one multiplexer.

For example, when the number of sensing nodes included in one block is 9 and a multiplexing number of times of one multiplexer is 3, the number of multiplexers included in one group corresponding to one block may be 3.

Each multiplexer corresponding to any one block may time-divisionally select two or more sensing nodes among sensing nodes belonging to one block.

For example, each of three multiplexers, corresponding to the first block Block1 of FIG. 15, may time-divisionally select three sensing nodes among nine sensing nodes belonging to Block1. In this case, the sensing nodes of Block1, which is time-divisionally selected by each multiplexer corresponding to Block1, may not overlap each other. For example, sensing nodes of Block1, which is time-divisionally selected by each multiplexer corresponding to Block1, may be different.

In addition, sensing nodes of a touch pad connected to multiplexers corresponding to the respective blocks may be positioned at different rows and columns.

In response to switching control signals provided from the controller 301, the sensing nodes of the touch pad connected to the multiplexers corresponding to the respective blocks may be time-divisionally selected, in embodiments.

In addition, sensing nodes, which are simultaneously selected by multiplexers that respectively correspond to blocks for driving in the first sensing direction, may be positioned at the same column, in embodiments.

In addition, sensing nodes, which are simultaneously selected by multiplexers that respectively correspond to blocks for driving in the second sensing direction, may be positioned at the same row, in embodiments.

Figure 16:
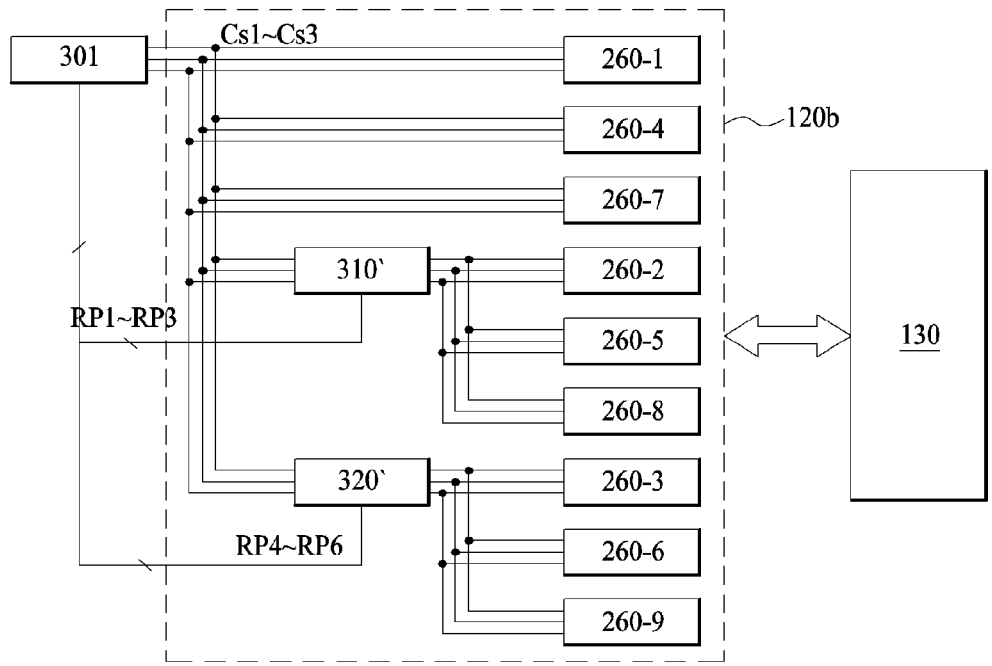
FIG. 16 is a diagram illustrating a selector as an example of a selector of the touch panel illustrated in FIG. 15.

FIG. 16 is a diagram illustrating a selector 120b as an example of the selector 120 of the touch panel 110 illustrated in FIG. 15.

Referring to FIG. 16, the selector 120b may include a plurality of multiplexers (e.g., 260-1 to 260-9) corresponding to blocks (e.g., Block1 to Block3) of the touch panel 110, and switching selection circuits 310' and 320'.

In FIG. 16, multiplexers (e.g., 260-1, 260-4, and 260-7) belonging to a first group among a plurality of multiplexers may receive the common switch control signals Cs1 to Cs3 directly from the controller 301.

Multiplexers (e.g., 260-2, 260-5, and 260-8) belonging to a second group among a plurality of multiplexers may receive common switching control signals, an order or positions of which are changed by the first switching selection circuit 310'.

Multiplexers (e.g., 260-3, 260-6, and 260-9) belonging to a third group among a plurality of multiplexers may receive common switching control signals, an order or positions of which are changed by the second switching selection circuit 320'.

Any one multiplexer (e.g., 260-1) of a first group, any one multiplexers (e.g., 260-2) of a second group, and any one multiplexers (e.g., (e.g., 260-3) of a third group may respectively correspond to blocks of the touch panel 110, and sensing in the first or second sensing direction may be performed on the touch panel 110 according to an operation of multiplexers (e.g., 260-1 to 260-3) and an operation of the switching selection circuits 310' and 320' based on the common switch control signals Cs1 to Cs3, and the selection control signals RP1 to RP6.

According to the embodiment illustrated in FIG. 16, switching selection circuits are commonly used by two or more multiplexers, and thus the number of selection control signals may be reduced and the size of the selector 120b may be reduced, thereby simplifying a circuit configuration of the selector 120b.

Hereinafter, sensing in the first and second sensing directions for embodying the sensing method illustrated in FIGS. 2 to 7 and the sensing mode illustrated in FIGS. 8 and 9, which will be described later, may be performed according to the aforementioned operation of a touch sensor.

FIGS. 2 to 7 are diagrams illustrating a method of sensing nodes of the touch panel 110 illustrated in FIG. 1, according to an embodiment.

Figure 2A:
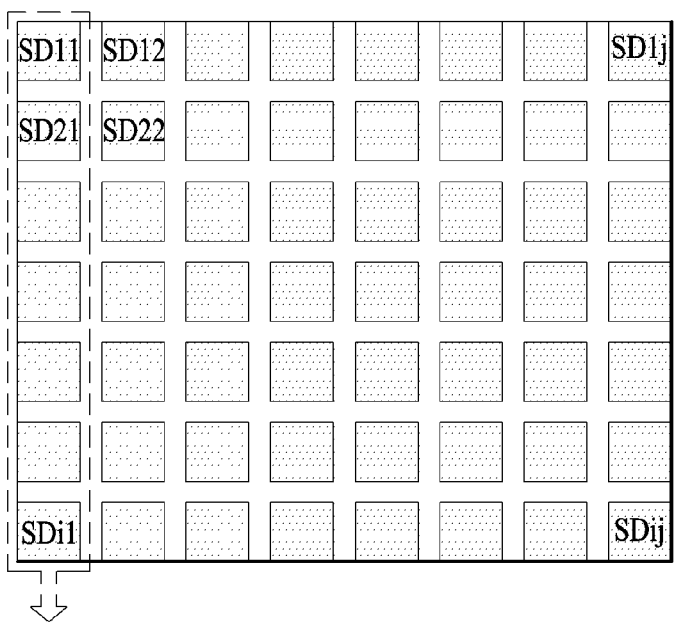
Figure 2B:
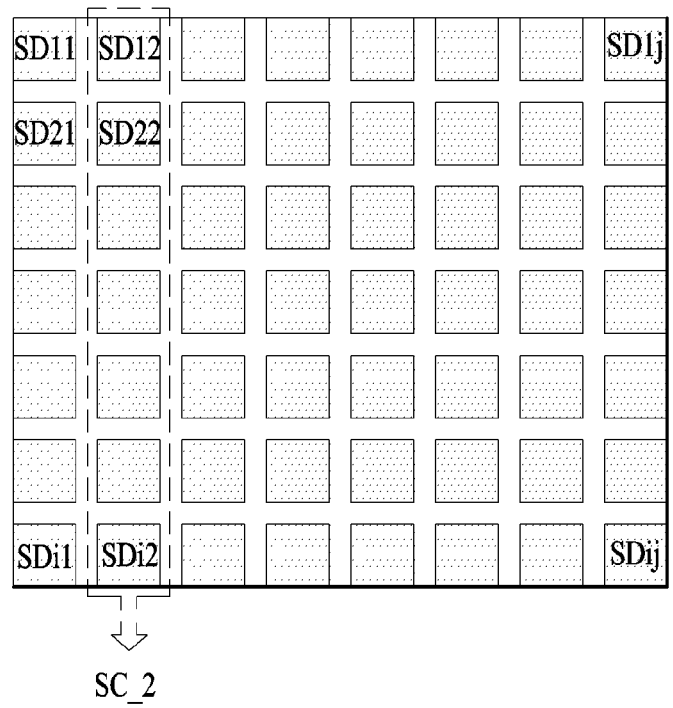
Figure 3A:
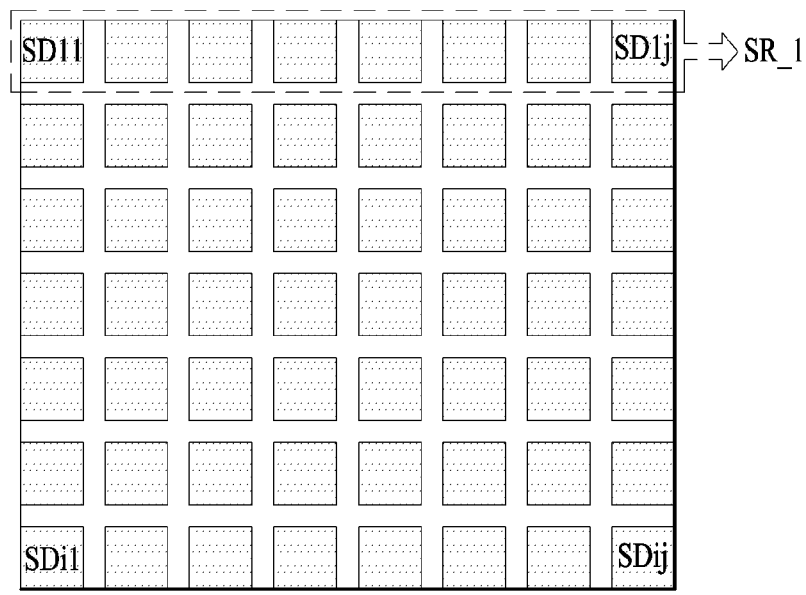
Figure 3B:
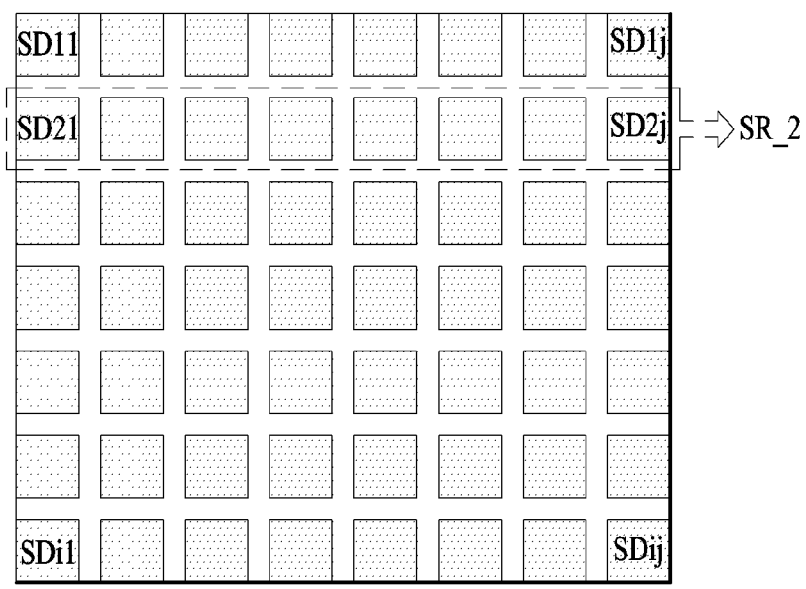
Figures 3C, 4A:
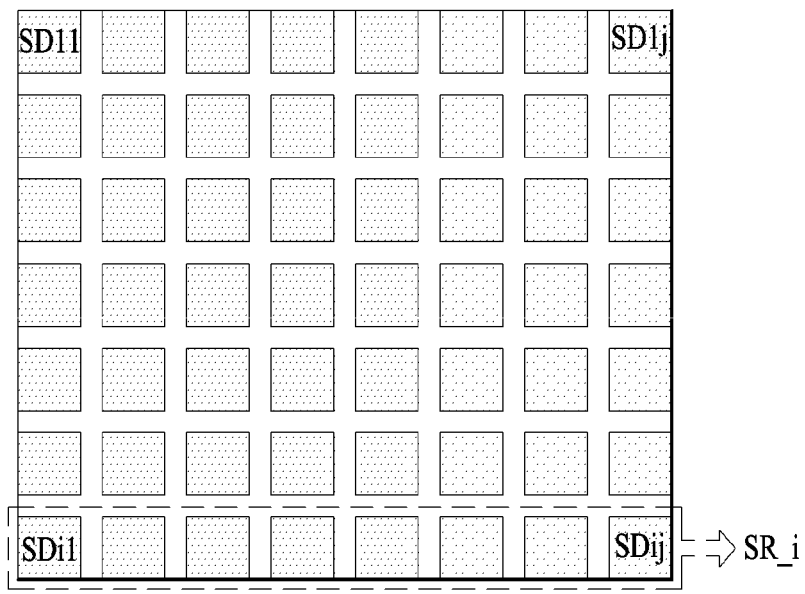

FIGS. 2A to 2B illustrate a sensing operation in a first sensing direction, and FIGS. 3A to 3C illustrate a sensing operation in a second sensing direction.

Here, the first sensing direction may be a column direction of the sensing nodes S11 to Snm (n and m each being a natural number greater than 1) in a matrix form, and the second sensing direction may be a row direction of the sensing nodes S11 to Snm (n and m each being a natural number greater than 1) in a matrix form.

For example, the sensing operation in the first sensing direction may refer to an operation in which sensing nodes included in any one of columns of the touch panel 110 are simultaneously sensed, and the sensing operation in the second sensing direction may refer to an operation in which sensing nodes included in any one of rows of the touch panel 110 are simultaneously sensed.

Figure 2C:
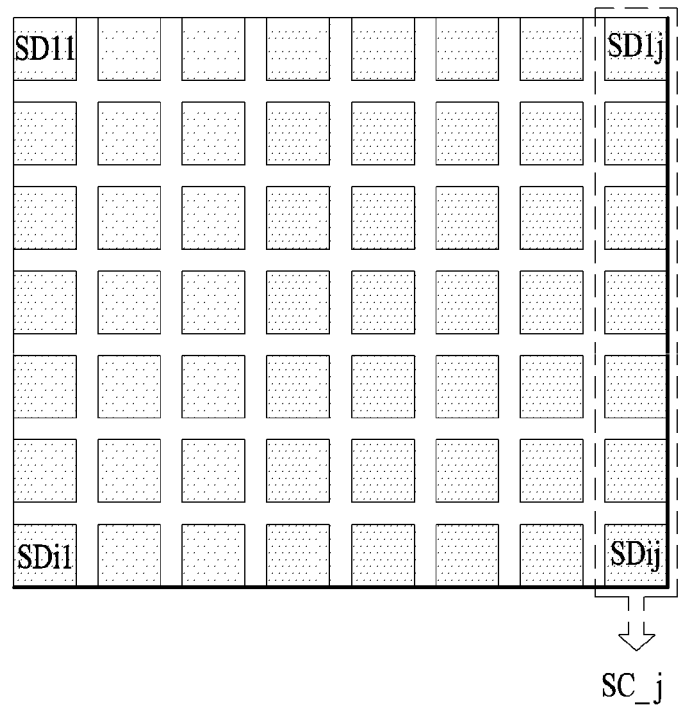

Referring to FIGS. 2A to 2C, a capacitance value of each of sensing nodes belonging to each column may be calculated based on a result obtained by simultaneously performing the sensing operation on sensing nodes belonging to each column. Here, the capacitance value may be a data value.

FIG. 2A illustrates a sensing operation SC-1 with respect to sensing nodes SD11 to SDi1 belonging to a first sensing nodes SD12 to SDi2 column, FIG. 2B illustrates a sensing operation SC-2 with respect to sensing nodes SD12 to SDi2 belonging to a second column, and FIG. 2C illustrates a sensing operation SC-j with respect to sensing nodes SD1j to SDij belonging to a $j^{th}$ column. Although not shown, a sensing operation may be simultaneously performed on sensing nodes belonging to the remaining columns.

A sensing operation in the first sensing direction may be sequentially performed to a $j^{th}$ column from a first column, without being limited thereto. According to another embodiment, the sensing operation may be performed in a random order.

Referring to FIGS. 3A to 3C, based on a result obtained by performing a sensing operation on sensing nodes belonging to each row, a capacitance value of each of sensing nodes belonging to each row may be calculated. Here, the capacitance value may be a data value.

FIG. 3A illustrates a sensing operation SR-1 with respect to sensing nodes SD11 to SD1j belonging to a first row, FIG. 3B illustrates a sensing operation SR-2 with respect to sensing nodes SD21 to SD2j belonging to a second row, and FIG. 3C illustrates a sensing operation SR-i with respect to sensing nodes SDi1 to SDij belonging to a $i^{th}$ row. Although not shown, a sensing operation may be simultaneously performed on sensing nodes belonging to the remaining rows.

A sensing operation in the second sensing direction may be sequentially performed to an $i^{th}$ row from a first row, without being limited there to. According to another embodiment, the sensing operation may be performed in a random order.

After the sensing operation in the first sensing direction is completely performed, the sensing operation in the second sensing direction may be completely performed. On the other hand, after the sensing operation in the second direction is completely performed, the sensing operation in the first sensing direction may be completely performed.

According to another embodiment, the sensing operation in the first sensing direction with respect to a column and the sensing operation in the second sensing direction with respect to a row may be alternately performed.

FIG. 4A illustrates first capacitance values CD11 to CDij (i and j each being a natural number greater than 1) of the sensing nodes SD11 to SD1j, which are calculated after the sensing operation in the first sensing direction described with reference to FIGS. 2A to 2C.

Referring to FIG. 4A, after the sensing operation in the first sensing direction is completed, the first capacitance values CD11 to Cdij (i and j each being a natural number greater than 1) corresponding to the sensing nodes SD11 to SD1j may be obtained.

FIG. 4B illustrates second capacitance values RD11 to RDij (i and j each being a natural number greater than 1) of the sensing nodes SD11 to SD1j, which are calculated after the sensing operation in the second sensing direction described with reference to FIGS. 3A to 3Cc.

Referring to FIG. 4B, after the sensing operation in the second sensing direction is completed, the second capacitance values RD11 to RDij (i and j each being a natural number greater than 1) corresponding to the sensing nodes SD11 to SD1j may be obtained.

Figure 6A:
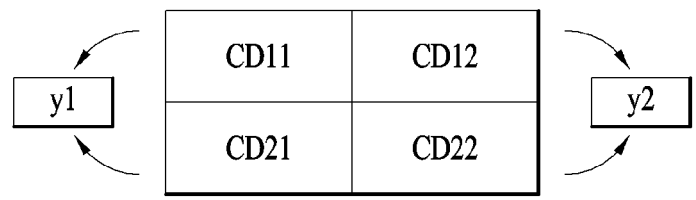

FIG. 6A illustrates first intermediate coordinates of touch using first capacitance values.

Referring to FIG. 6A, the first intermediate coordinates of touch may be calculated based on the first capacitance values of two sensing nodes belonging to each column.

For example, a first intermediate coordinate y1 of touch may be calculated based on the first capacitance values CD11 and CD21 of two adjacent sensing nodes SD11 and DS21 of a first column, and a first intermediate coordinate y2 of touch may be calculated based on the first capacitance values CD12 and CD22 of two adjacent sensing nodes SD12 and SD22 of a second column. For example, each of the first intermediate coordinates y1 and y2 may be calculated according to a centroid method.

The first intermediate coordinate y1 with respect to the sensing nodes SD11 and DS21 may be calculated using a centroid method according to Equation 1 below.

$$y1 = \frac{CD21}{CD11 + CD21} \times \text{Weight} \qquad \text{[Equation 1]}$$

The first intermediate coordinate y2 with respect to the sensing nodes SD12 and SD22 may be calculated using a centroid method according to Equation 2 below.

$$y2 = \frac{CD22}{CD12 + CD22} \times \text{Weight} \qquad \text{[Equation 2]}$$

Figure 6B:
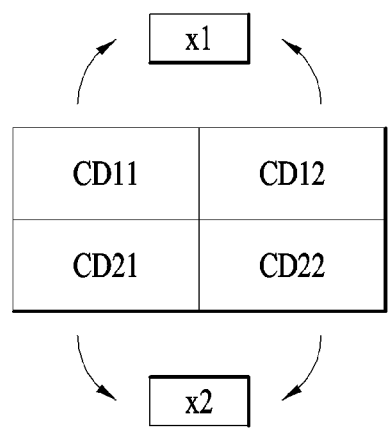

FIG. 6B is a diagram illustrating second intermediate coordinates of touch using second capacitance values.

Referring to FIG. 6B, the second intermediate coordinates of touch may be calculated based on second capacitance values of two adjacent sensing nodes belonging to each row.

For example, a second intermediate coordinate x1 of touch may be calculated based on second capacitance values RD11 and RD12 of two adjacent sensing nodes SD11 and SD12 belonging to a first row, and a second intermediate coordinate x2 of touch may be calculated based on second capacitance values RD21 and RD22 of two adjacent sensing nodes SD21 and SD22 of a second row. For example, the second intermediate coordinates x1 and x2 may be calculated using a centroid method.

The second intermediate coordinate x1 with respect to the sensing nodes SD11 and SD12 may be calculated using a centroid method according to Equation 3 below.

$$x1 = \frac{RD12}{RD11 + RD12} \times \text{Weight} \qquad \text{[Equation 3]}$$

The second intermediate coordinate x2 with respect to the sensing nodes SD21 and SD22 may be calculated using a centroid method according to Equation 4 below.

$$x2 = \frac{RD22}{RD21 + RD22} \times \text{Weight} \qquad \text{[Equation 4]}$$

Here, Weight in equation 4 means a weighted value about resolution. For example, Weight may be resolution of a display device, for example, a liquid crystal display (LCD) device.

Figure 7A:
Figure 7B:
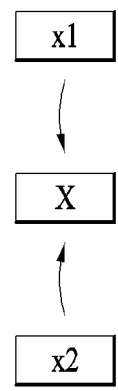

FIGS. 7A and 7B are diagrams illustrating last coordinates (Y, X) of touch using first intermediate coordinates y1 and y2 and second intermediate coordinates x1 and x2.

Referring to FIG. 7A, a first last coordinate Y with respect to sensing nodes SD11 to SD22 may be calculated based on first intermediate coordinates y1 and y2.

The first last coordinate Y with respect to the sensing nodes SD11 to SD22 may be calculated using a centroid method according to Equation 5 below.

$$Y = \frac{y1 \cdot CD21 + y2 \cdot CD22}{CD21 + CD22} \qquad \text{[Equation 5]}$$

Referring to FIG. 7B, a second last coordinate x with respect to the sensing nodes SD11 to SD22 may be calculated based on second intermediate coordinates x1 and x2.

The second last coordinate x with respect to the sensing nodes SD11 to SD22 may be calculated using a centroid method according to Equation 6 below.

$$X = \frac{x1 \cdot RD12 + x2 \cdot RD22}{RD12 + RD22} \qquad \text{[Equation 6]}$$

Equations 1 to 6 are equations for obtaining intermediate coordinates and last coordinates with respect to two data values using a centroid method, but embodiments of the claimed invention are not limited to the intermediate coordinates and last coordinates with respect to the two data values.

For example, first intermediate coordinates with respect to n data values in a first direction may also be calculated using a centroid method, a second intermediate coordinate with respect to m data values in a second direction may be calculated using a centroid method, and a last coordinate may be calculated using the calculated first intermediate coordinate and second intermediate coordinate.

As described above, intermediate coordinates and last coordinates may be calculated via a centroid method using some or all of data values calculated according to the sensing result. For example, only data values that are equal to or greater than a threshold value may be grouped among first and second data values obtained according to a result obtained via sensing in first and second directions, and intermediate coordinates and last coordinates may be calculated using only the grouped data values.

As described with respect to FIGS. 2 to 7, a touch sensing method for driving a touch panel including sensing nodes arranged in a matrix form with columns and rows will now be described.

The touch sensing method according to an embodiment may include calculating first capacitance values based on a result obtained by performing a sensing operation in a first sensing direction, calculating second capacitance values based on a result obtained by performing a sensing operation in a second sensing direction, calculating first intermediate coordinates of touch using the first capacitance values, calculating second intermediate coordinates of touch using the second capacitance values, calculating first last coordinates based on the first intermediate coordinates, and calculating a second last coordinate based on the second intermediate coordinates.

The first intermediate coordinates may be calculated based on the first capacitance values of two or more sensing nodes included in each column, and the second intermediate coordinates may be calculated based on second capacitance values of two or more sensing nodes included in each row.

For example, the first intermediate coordinates may be calculated based on the first capacitance values of two adjacent sensing nodes belonging to each column, and the second intermediate coordinates may be calculated based on the second capacitance values of two adjacent sensing nodes belonging to each row.

The first intermediate coordinates and the second intermediate coordinates may be calculated using a centroid method. In addition, the first last coordinates and the second last coordinates may be calculated using a centroid method.

Main noise of a touch sensor may be introduced from a touched object, and a touch signal may be shaken when noise is introduced, and accordingly, touch may not be recognized or an error may be generated in touch coordinates, and inaccurate input of a touch sensor may occur due to the touch coordinates with error.

Noises provided from a power source or a surrounding environment may be introduced to sensing nodes, which are simultaneously sensed among sensing nodes of a touch panel, at the same ratio.

Assuming that noises are introduced to simultaneously sensed sensing according to a touched area, for example, an area of touched sensing nodes, according to an embodiment of the claimed invention, intermediate coordinates with respect to adjacent sensing nodes may be calculated using a centroid method and last coordinates may be calculated using the calculated intermediate coordinates so as to remove a noise component for touch coordinate calculation or to overcome influence of noise. However, in order to simultaneously sense all sensing lines, a problem arises in that the size of the touch sensor 100 is increased, and thus, according to an embodiment of the claimed invention, columns or rows may be time-sequentially sensed.

FIG. 5A illustrates capacitance values according to a result obtained by sequentially sensing a first column and a second column in a first environment without introduced noise, and FIG. 5B illustrates capacitance values according to a result obtained by sequentially sensing a first column and a second column in a second environment with introduced noise. FIG. 5B illustrates the case in which noise is introduced when noise is not introduced during sensing in the first column and noise is introduced during sensing in the second column.

Referring to FIGS. 5A and 5B, during sensing in the second column of FIG. 5B, noise may be introduced at the same ratio according to a touched area. Accordingly, calculated intermediate coordinates in FIGS. 5A and 5B may be the same. However, the last coordinates of FIG. 5A and the last coordinates of FIG. 5B are different because last coordinates are calculated according to Equation 6 above.

As shown in the last coordinates of FIG. 5B, according to an embodiment, last coordinates are calculated in considerate of an environment in which noise is introduced, and thus touch coordinate values of touch may also be accurately obtained in an environment in which noise is introduced, thereby enhancing the reliability of touch sensing.

Figure 8:
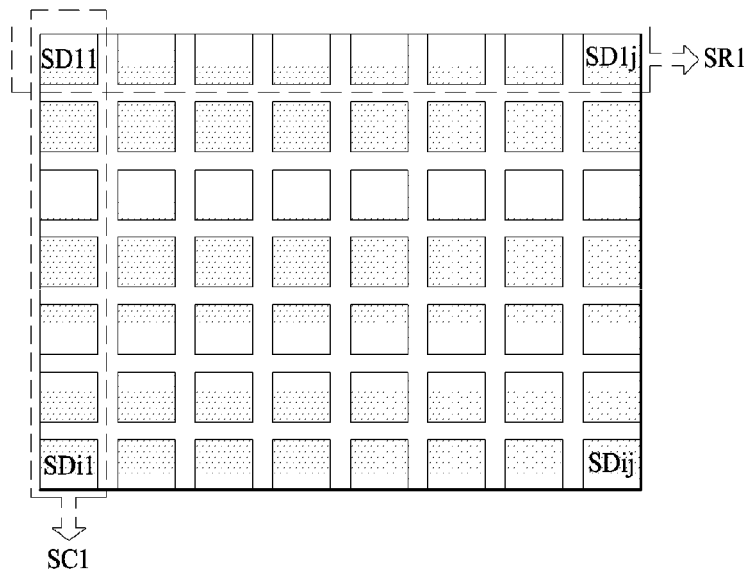
FIGS. 8 and 9 are diagrams a method of sensing the sensing nodes of the touch panel illustrated in FIG. 1, according to another embodiment of the claimed invention.
Figure 9:
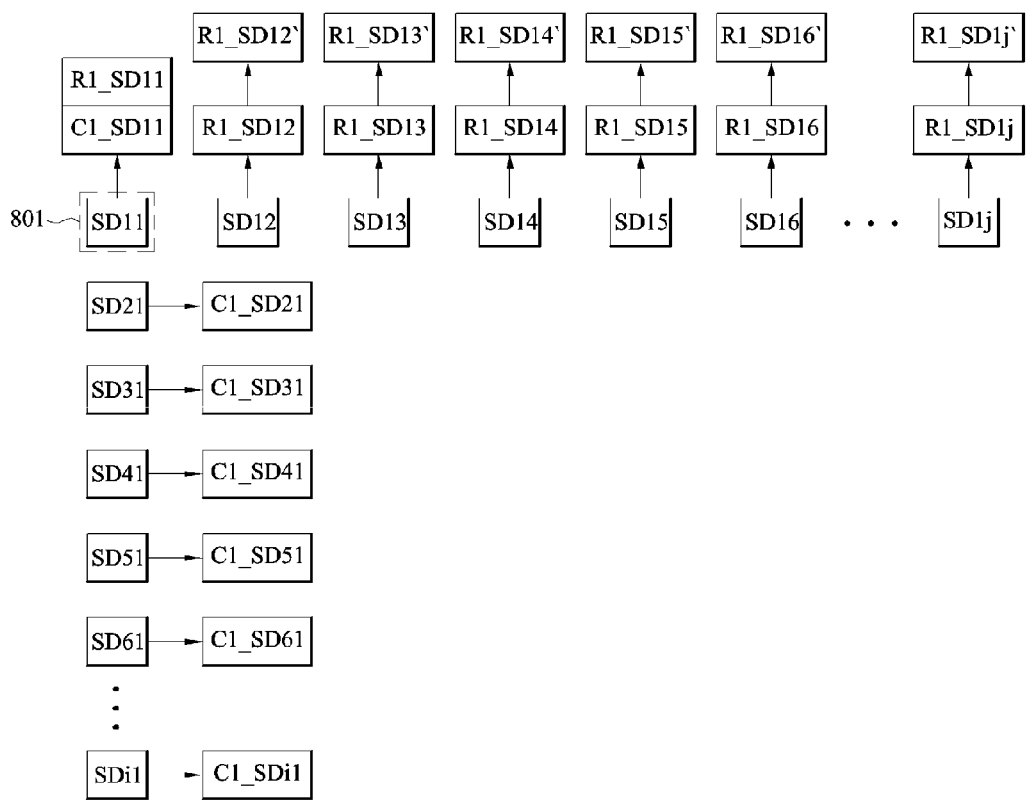

FIGS. 8 and 9 are diagrams a method of sensing the sensing nodes S11 to Snm (n and m each being a natural number greater than 1) of the touch panel 110 illustrated in FIG. 1, according to another embodiment.

Referring to FIGS. 8 and 9, a first sensing operation may be performed on the sensing nodes S11 to Snm (n and m each being a natural number greater than 1), and a second sensing operation may be performed on the sensing nodes S11 to Snm (n and m each being a natural number greater than 1).

In the first sensing operation, driving signals may be simultaneously provided to first sensing nodes among the sensing nodes S11 to Snm (n and m each being a natural number greater than 1) during a first sensing period, and first capacitance of each of the first sensing nodes to which the driving signals are provided may be measured.

In the second sensing operation, driving signals may be simultaneously provided to second sensing nodes among the sensing nodes S11 to Snm (n and m each being a natural number greater than 1) during a second sensing period, and second capacitance of each of the second sensing nodes to which the driving signals are provided may be measured. The first and second capacitance may each be calculated as a data value.

The first sensing operation and the second sensing operation may be time-sequentially performed. In addition, the first sensing operation and the second sensing operation may be serial and/or consecutive.

For example, simultaneous provision of a first driving signal to first sensing nodes and simultaneous provision of a driving signal to second sensing nodes may be time-sequentially performed. Alternatively, simultaneous provision of a first driving signal to first sensing nodes and simultaneous provision of a driving signal to second sensing nodes may be serial and consecutive.

At least one of the first sensing nodes may overlap or may be the same as at least one of the second sensing nodes. For example, any one of the first sensing nodes may be the same as any one of the second sensing nodes.

For example, the first sensing operation may be a sensing operation in the first sensing direction, and the second sensing operation may be a sensing operation in the second sensing direction, without being limited thereto.

For example, as illustrated in FIG. 8, a first sensing operation SC1 may be a sensing operation with respect to first sensing nodes SD11 to SDi1 belonging to a first column of the touch panel 110, and a second sensing operation SR1 may be a sensing operation with respect to second sensing nodes SD11 to SD1j belonging to a second column of the touch panel 110. In this case, duplicated sensing 801 may occur in the sensing node SD11 positioned in a first row and a first column of the touch panel 110, and the sensing node SD11 may be a node in which both of the first sensing operation SC1 and the second sensing operation SR1 are performed.

According to another embodiment, the first and second sensing operations may each be a sensing operation in the first sensing direction, or according to further another embodiment, the first and second sensing operations may each be a sensing operation in the second sensing direction. It is sufficient that one or more among sensing nodes as a target of the first sensing operation and sensing nodes as a target of the second sensing operation overlap.

FIG. 9 is a diagram illustrating data values of first and second capacitances calculated via the first and second sensing operations of FIG. 8.

Referring to FIG. 9, first data values C1_SD11 to C1_SDi1 that respectively correspond to the sensing nodes SD11 to SDi1 belonging to a first column may be calculated according to a result of the first sensing operation SC1.

Second data values R1_SD11 to R1_SD1j that respectively correspond to the sensing nodes SD11 to SD1j belonging to a first row may be calculated according to a result of the second sensing operation SR1.

The sensing node SD11 may have the first data value C1_SD11 according to the result of the first sensing operation and the second data value R1_SD11 according to the result of the second sensing operation.

The first data value C1_SD11 and the second data value R1_SD11 of the sensing node SD11 may be compared, and a data value of second sensing nodes SD11 to SD1j as a target of the second sensing operation SR1 may be changed based on the comparison result.

For example, a difference C1_SD11−R1_SD11 between the first data value C1_SD11 and the second data value R1_SD11 of the sensing node SD11 may be calculated. A data value of the second sensing nodes SD11 to SD1j may be changed based on the calculated difference C1_SD11−R1_SD11.

That is, a second data value of the second sensing nodes SD11 to SD1j may be changed by as much as the difference C1_SD11−R1_SD11 between the first data value C1_SD11 and the second data value R1_SD11 of the sensing node SD11.

According to an embodiment of the claimed invention, coordinates of touch are calculated based on a changed second data value, and thus the coordinates of touch may also be obtained without influence of noise in an environment in which noise is introduced, thereby enhancing the reliability of touch.

In the embodiment illustrated in FIGS. 8 and 9, first and second data values may be obtained according to results obtained by sensing in different sensing directions, but the first and second data values are time-divisionally sensed, and thus may be differently affected by noise. Accordingly, the first and second data values may be normalized to data values in the same time zone via the aforementioned data value correction.

Figure 17:
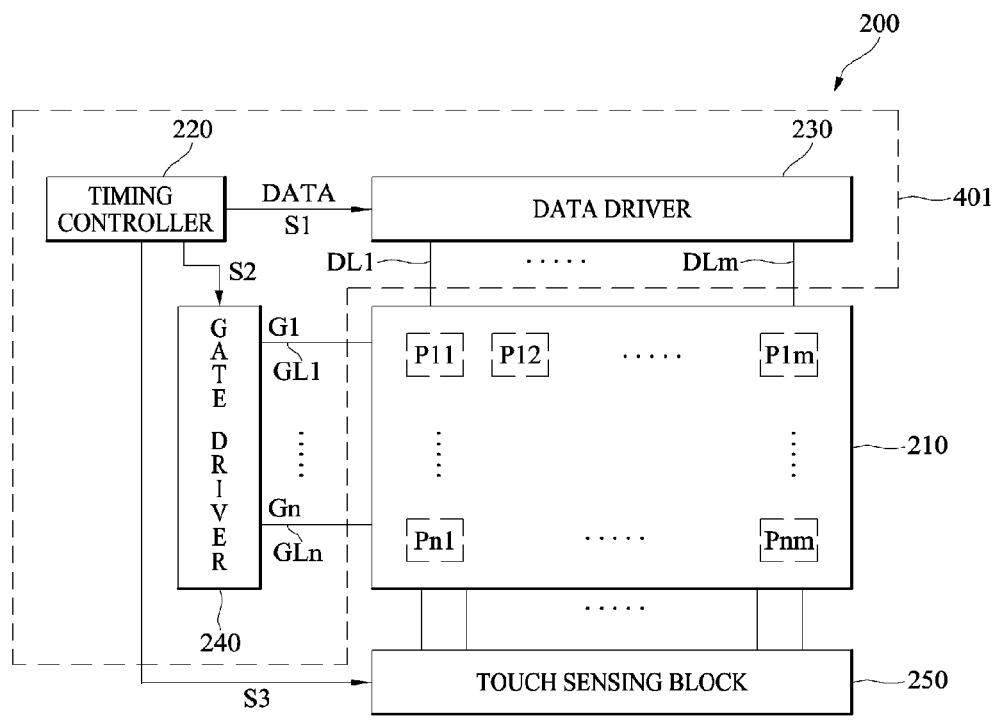
FIG. 17 is a diagram illustrating a structure of a display apparatus according to an embodiment of the claimed invention.

FIG. 17 is a diagram illustrating a structure of a display apparatus 200 according to an embodiment. The display apparatus 200 illustrated in FIG. 17 may be an in-cell-type display apparatus.

The display apparatus 200 may include a panel 210, a timing controller 220, a data driver 230, a gate driver 240, and a touch sensing block 250.

The timing controller 220, the data driver 230, and the gate driver 240 may be embodied as a controller as one display integrated circuit IC 401. In addition, the touch sensing block 250 may be embodied as one touch sensing IC, without being limited thereto.

The display IC may display-drive the panel 210 during a period of a display operation and may touch-sensing drive the panel 210 during a period of a touch sensing operation of the panel 210.

The panel 210 may be display panel including a touch sensor or a touchscreen. For example, the panel 210 may be an in-cell type panel using a capacitive method in which display driving and touch driving are separated in terms of time during one frame.

Figure 18:
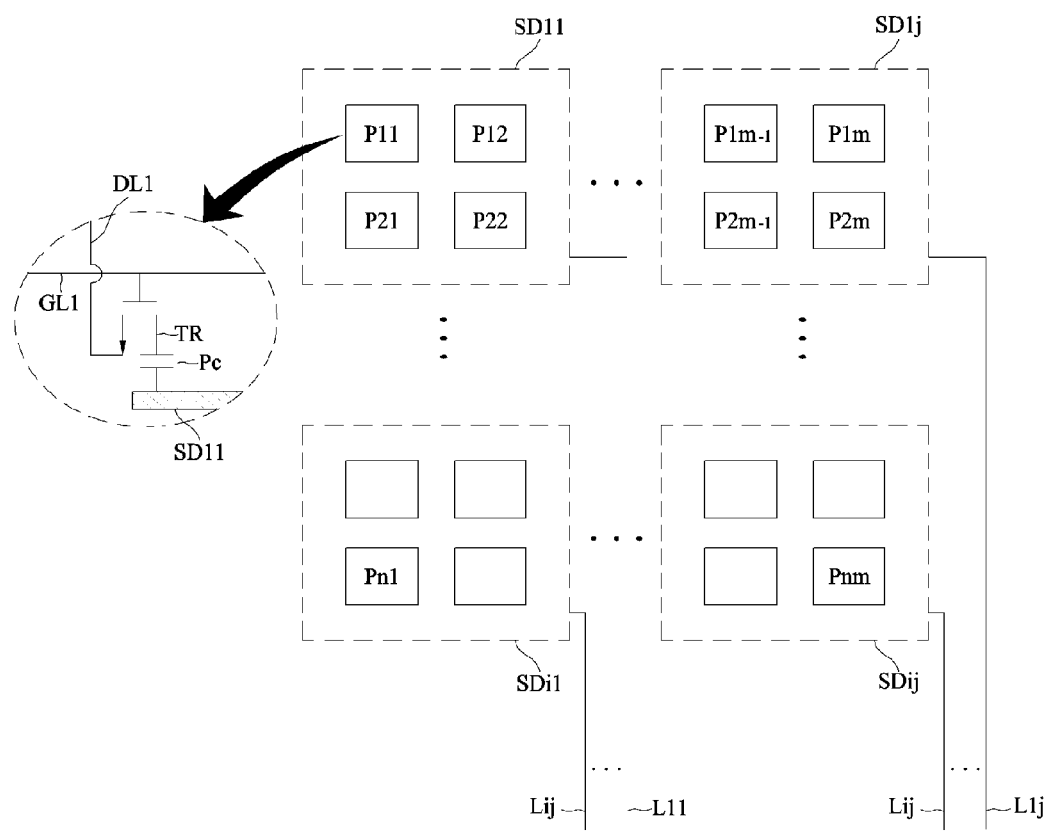
FIG. 18 is a diagram illustrating a panel illustrated in FIG. 17, according to an embodiment of the claimed invention.

FIG. 18 is a diagram illustrating the panel 210 illustrated in FIG. 17, according to an embodiment.

Referring to FIGS. 17 and 18, the panel 210 may include data lines DL1 to DLm (m being a natural number greater than 1), gate lines GL to GLn (n being a natural number greater than 1), and display pixels P11 to Pnm (n and m each being a natural number greater than 1) for displaying colors.

Each of the display pixels P11 to Pnm (n and m each being a natural number greater than 1) may include a pixel capacitor Pc and a transistor TR. The transistor TR may include a gate (e.g., GL1) connected to a gate line, a drain (or source) connected to a data line (e.g., DL1), and a source (or drain) connected to one end of the pixel capacitor Pc among two adjacent data line (e.g., DL1) and gate line (GL1) which cross each other.

In addition, the panel 210 may include a plurality of common electrodes CE11 to CEij (i and j each being a natural number greater than 1) connected to the other end of the pixel capacitor Pc of the display pixels P11 to Pnm (n and m each being a natural number greater than 1). Although FIG. 18 illustrates the case in which four adjacent pixels (e.g., P11, P12, P21, and P22), for example, 2×2 pixels share one common electrode, without being limited thereto, and thus various modifications may be made.

For example, the panel 210 may be divided into two or more groups, and each of the two or more groups may include a plurality of display pixels. Display pixels belonging to each group may not overlap each other.

Each of the common electrodes CE11 to CEij (i and j each being a natural number greater than 1) may be commonly connected to the other one of the pixel capacitors Pc of display pixels P11 to P22 belonging to a corresponding one (e.g., CE11) the groups.

The common electrodes CE11 to CEij (i and j each being a natural number greater than 1) may be used as an electrode for supplying a common voltage Vcom to the display pixels P11 to Pnm (n and m each being a natural number greater than 1) in order to drive liquid crystal during a display operation period and may be used as an electrode to which a driving signal is supplied for touch sensing during a touch sensing operation period.

For example, during the touch sensing operation period, the common electrodes CE11 to CEij (i and j each being a natural number greater than 1) may function as sensing nodes, coordinates, sensing points, nodes, or a sensing node array.

In addition, touch detection may be achieved using a method of detecting change in self-capacitance between common electrodes or a method of detecting change in mutual capacitance between common electrodes.

Gate lines may also be referred to as "gate electrode", data lines may also be referred to as "data electrode", and the gate electrode and the data electrode may also be referred to as "display electrode".

The aforementioned panel 210 may be merely an embodiment, and thus in alternative embodiments the panel 210 may be embodied as various types of in-cell type panels.

The timing controller 220 may generate data DATA for driving the panel 210, a first control signal S1 for controlling the data driver 230, a second control signal S2 for controlling the gate driver 240, and a third control signal S3 for controlling the touch sensing block 250.

For example, the first control signal S1 may include a horizontal start signal, an enable signal, a clock signal CLK, a horizontal line signal (or a horizontal synchronization signal), or a frame signal (or a vertical synchronization signal) which is input to a shift register of the data driver 230.

The frame signal may be a signal for defining 1 frame. For example, 1 period of the frame signal may be set as 1 frame. In addition, the horizontal line signal may be a signal for defining 1 horizontal period required to write the data DATA pixels of 1 line in a pixel array of the panel 210. 1 period of the horizontal line signal may be set to 1 horizontal period.

Figure 19:
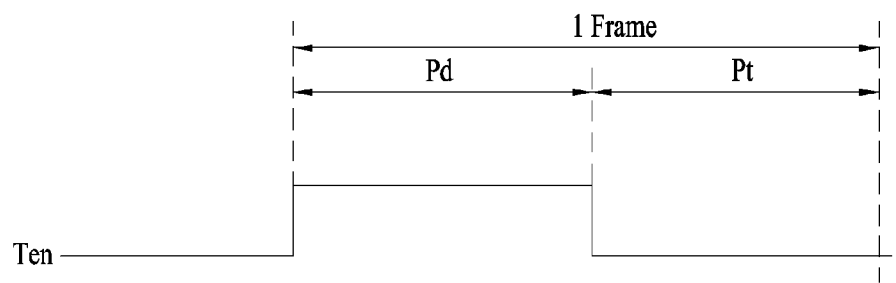
FIG. 19 is a diagram illustrating one frame period.

FIG. 19 is a diagram illustrating 1 frame period.

Referring to FIG. 19, 1 frame of the display apparatus 200 may include a time-divided display period Pd and touch sensing period Pt.

The data driver 230 may include a shift register, a latch unit), a level shifter, an analog-digital converter, and an outputter.

The shift register may generate a shift signal in response to an enable signal and a clock signal in order to control timing for storing the data DATA in the latch unit. The latch unit may store the data DATA in response to the shift signal. The level shifter may convert a level of the data DATA stored in the latch unit. A digital-to-analog converter may convert the level-converted data DATA into an analog signal. The outputter may amplify (buffer) the analog signal output from the digital-to-analog converter and output the amplified (or buffered) analog signal to the data lines DL1 to DLm (m being a natural number greater than 1).

The gate driver 240 may drive the gate lines GL to GLn (n being a natural number greater than 1) in response to the second control signal S2.

For example, the gate driver 240 may output gate driving signals G1 to G (n being a natural number greater than 1) to the gate lines GL to GLn (n being a natural number greater than 1) in response to the second control signal S2. According to the gate driving signals G1 to G (n being a natural number greater than 1), the transistor TR of a display pixel of each of the gate lines may be turned on or off.

The touch sensing block 250 may provide a driving signal to the common electrodes CE11 to CEij (i and j each being a natural number greater than 1) during a touch sensing operation (or touch sensing mode) period Pt (refer to FIG. 9) and detect a signal received through the common electrodes CE11 to CEij (i and j each being a natural number greater than 1) according to change in self-capacitance of the common electrodes CE11 to CEij (i and j each being a natural number greater than 1) a common nodes due to touch or according to change in mutual-capacitance between common electrodes. In the display operation period Pd may provide a common voltage Vcom to the common electrodes CE11 to CEij (i and j each being a natural number greater than 1).

Referring to FIG. 18, the panel 210 may further include the sensing lines L11 to Lij connected to the common electrodes CE11 to CEij (i and j each being a natural number greater than 1).

The touch sensing block 250 may include the selector 120 and the touch sensing unit 130 described with reference to FIG. 1.

For example, the touch sensing block 250 may include the touch sensing unit 130 for providing driving signals and the selector 120 for selectively providing the driving signals provided from the touch sensing unit 130 to sensing nodes, and the selector 120 may include the multiplexers 260-1 to 260-k.

In addition, the touch sensing block 250 may further include a digital-to-analog converter and a digital signal processor.

The description of the selector 120 and the touch sensing unit 130 with respect to FIGS. 1 and 10 to 16 may also be applied to the touch sensing block 250 of FIG. 17 in the same way.

In addition, the display apparatus 200 of FIG. 17 uses common electrodes as sensing electrodes, without being limited thereto. According to another embodiment, any one of display electrodes, for example, a gate electrode, a source electrode, and a pixel electrode may be used as a sensing electrode.

In order to reduce parasitic capacitance between the sensing electrode and the display electrodes, a guarding signal may be provided to at least one of other display electrodes except for a sensing electrode during a sensing period.

For example, a difference between the guarding signal and a driving signal provided to sensing nodes may be constant. For example, the guarding signal may be the same as the driving signal. For example, at least one of a frequency, a phase, a shape, and/or amplitude of the guarding signal may be the same as that of the driving signal.

As described above, according to embodiments, accurate coordinates may also be obtained in an environment with noise.

It will be apparent to those skilled in the art that various modifications and variations can be made without departing from the spirit or scope of the claims.

What is claimed is:
1. A touch sensor comprising:
a touch panel including sensing nodes arranged in a matrix form and sensing lines connected to the sensing nodes;
a touch sensing unit configured to produce driving signals corresponding to the sensing nodes;
a selector, electrically coupled to the touch sensing unit to receive the driving signals, and including a plurality of multiplexers for selectively providing the driving signals provided from the touch sensing unit to the sensing lines of the touch panels, wherein each of the multiplexers comprises a plurality of selection switches for time-divisionally providing the driving signals provided from the touch sensing unit to sensing nodes;
a controller configured to generate switch control signals for controlling the selection switches included in each of the multiplexers and provide a common switch control signal to a first multiplexer among the multiplexers; and
a switching selection circuit configured to convert the common switch control signal and provide a signal obtained from a result of the converting to selection switches of any corresponding one of other multiplexers except for the first multiplexer, wherein:
each of the multiplexers is selectively connected to two or more corresponding sensing nodes among the sensing nodes; and
the two or more sensing nodes of the touch panel, selectively connected to each of the multiplexers, are positioned at different columns and rows.

2. The touch sensor according to claim 1, wherein the two or more sensing nodes connected to each of the multiplexers are time-divisionally selected.

3. The touch sensor according to claim 2, wherein sensing nodes that are simultaneously selected by each of the multiplexers are positioned at the same column.

4. The touch sensor according to claim 2, wherein sensing nodes that are simultaneously selected by each of the multiplexers are positioned at the same row.

5. The touch sensor according to claim 1, wherein the switching selection circuit comprises:
connection lines with the common switch control signals provided thereto;
control lines connected to the selection switches included in the any corresponding one multiplexer; and
a switch for selectively connecting the connection lines to the control lines based on the selection control signals provided from the controller.

6. The touch sensor according to claim 1, wherein:
the touch panel comprises sensing nodes arranged in a M×N (M and N each being a natural number greater than 1) matrix form;
each of the multiplexers is an M:1 multiplexer and is selectively connected to corresponding M sensing nodes among the sensing nodes in a M×N matrix form; and
the M sensing nodes respectively connected to the multiplexers are positioned at different rows and columns.

7. The touch sensor according to claim 6, wherein the sensing nodes arranged in an M×N matrix form, simultaneously selected by each of the M:1 multiplexer, are positioned at the same column or the same row.

8. The touch sensor according to claim 1, wherein:
the touch sensing unit comprises a plurality of sensing terminals; and
each of the sensing terminals provides driving signals to any corresponding one of the multiplexers.

9. A display apparatus comprising:
a panel including display pixels arranged along columns and rows, the panel having data lines, gate lines, and sensing nodes;
a driver configured to provide driving signals to the data lines;
a gate driver configured to provide an electrical output signal to the gate lines; and
a touch sensing block including a touch sensing unit configured to provide the driving signals to the sensing nodes and the display pixels, and a selector comprising a plurality of multiplexers selectively connected to two or more corresponding sensing nodes among the sensing nodes and configured to selectively provide the driving signals provided from the touch sensing unit to the sensing lines of the touch panel, and wherein each of the multiplexers comprises a plurality of selection switches for time-divisionally providing the driving signals provided from the touch sensing unit to sensing nodes,
wherein the touch sensing block further comprises:
a controller configured to generate switch control signals for controlling the selection switches included in each of the multiplexers and provide a common switch control signal to a first multiplexer among the multiplexers; and
a switching selection circuit configured to convert the common switch control signal and provide a signal obtained from a result of the converting to selection switches of any corresponding one of other multiplexers except for the first multiplexer,
wherein the two or more sensing nodes corresponding to each of the multiplexers are positioned at different columns and rows relative to one another.

10. The display apparatus according to claim 9, wherein:
each of the display pixels comprises a pixel capacitor, a gate connected to any corresponding one of gate lines, a source connected to any corresponding one of data lines, a transistor connected to one end of the pixel capacitor, and a common electrode connected to the other end of the pixel capacitor; and the sensing nodes are common electrodes of the display pixels.

11. The display apparatus according to claim 10, wherein a common voltage is applied to common electrodes in a display operation period.

* * * * *